United States Patent
Bertram et al.

(10) Patent No.: US 7,043,700 B1
(45) Date of Patent: May 9, 2006

(54) MOBILE CLIENT COMPUTER PROGRAMMED TO PREDICT INPUT

(75) Inventors: Randal Lee Bertram, Raleigh, NC (US); David Frederick Champion, Durham, NC (US); Peter James Brittenham, Apex, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 0 days.

(21) Appl. No.: 09/143,967

(22) Filed: Aug. 31, 1998

Related U.S. Application Data

(63) Continuation of application No. 08/703,171, filed on Aug. 22, 1996, now Pat. No. 5,864,340.

(51) Int. Cl.
*G06F 3/00* (2006.01)
(52) U.S. Cl. .................... 715/811; 715/812; 715/813; 715/816; 715/822; 715/507
(58) Field of Classification Search ................ 345/715, 345/745, 747, 789, 808, 809, 810, 811, 812, 345/813, 816, 817, 825, 822, 823; 715/505, 715/506, 507, 508, 811, 812, 813, 815, 816, 715/817, 822, 823, 825, 864
See application file for complete search history.

(56) References Cited

U.S. PATENT DOCUMENTS

| | | | | | |
|---|---|---|---|---|---|
| 5,367,619 | A | * | 11/1994 | Dipaolo et al. | 707/506 |
| 5,666,502 | A | * | 9/1997 | Capps | 345/352 |
| 5,805,911 | A | * | 9/1998 | Miller | 715/534 |
| 5,901,246 | A | * | 5/1999 | Hoffberg et al. | 382/209 |

FOREIGN PATENT DOCUMENTS

| | | |
|---|---|---|
| JP | 63016325 | 1/1988 |
| JP | 64076267 | 3/1989 |
| JP | 02131623 | 5/1990 |
| JP | 04227566 | 8/1992 |
| JP | 04296919 | 10/1992 |
| JP | 06197077 | 7/1994 |
| JP | 07028919 | 1/1995 |
| JP | 08095736 | 4/1996 |

\* cited by examiner

*Primary Examiner*—Ba Huynh
(74) *Attorney, Agent, or Firm*—Robert A. Voigt, Jr.; Winstead Sechrest & Minick P.C.

(57) ABSTRACT

A computer system preferably a mobile client computer, optimizes data handling and display through the use of predictive widgets. A predictive widget uses a predictive list of possible entries into a defined field of a form, as in a form filling application, to provide one or both of a predictive default entry for a field or a predictive fill once a user has started an entry into the field.

6 Claims, 11 Drawing Sheets

FIG. 8

Candida Form

Candida Bloodstream Infections Multicenter Study

Center: 12
Date of birth: 04-29-54
Date of admission: 04-29-54
Primary ICD9

Hospital number: 123456789
Male ○  Female ○
Date admission ICU: 04-29-54
Secondary ICd9

Record 1 of 6

Date of surgery
Minutes
ASA score

Type: Access Procedure
Anesthesia
Class: Clean-contaminated
Urgency

FIG. 11

| n | Item | b=1 | | b=4 | | b=10 | |
|---|---|---|---|---|---|---|---|
| | | w | W | w | W | w | W |
| 0 | Champion | 1.00 | 1.33 | 1.00 | 1.67 | 1.00 | 1.83 |
| 1 | Bertram | 0.50 | 0.95 | 0.80 | 1.87 | 0.91 | 2.39 |
| 2 | (Champion) | 0.33 | | 0.67 | | 0.83 | |
| 3 | (Bertram) | 0.25 | | 0.57 | | 0.77 | |
| 4 | (Bertram) | 0.20 | | 0.50 | | 0.71 | |
| 5 | Brittenham | 0.17 | 0.65 | 0.44 | 1.85 | 0.67 | 2.96 |
| 6 | (Brittenham) | 0.14 | | 0.40 | | 0.63 | |
| 7 | (Brittenham) | 0.13 | | 0.36 | | 0.59 | |
| 8 | (Brittenham) | 0.11 | | 0.33 | | 0.56 | |
| 9 | (Brittenham) | 0.10 | | 0.31 | | 0.53 | |

FIG. 12

MOBILE CLIENT COMPUTER PROGRAMMED TO PREDICT INPUT

RELATED APPLICATIONS

The present application is a continuation and claims priority to U.S. patent application Ser. No. 08/703,171, filed on Aug. 22, 1996, now U.S. Pat. No. 5,864,340, issued on Jan. 26, 1999, which is hereby incorporated herein by reference in its entirety.

This application is one of a series of related applications assigned to common ownership. Other applications in the series include:

application Ser. No. 08/781,004 filed 9 Jan. 1997, entitled "Mobile Client Computer with Keyboard Interface" with named inventors T. Aebli, B. Miller and W. W. Vetter;

application Ser. No. 08/708,168 filed 22 Aug. 1997, entitled "Mobile Client Computer Programmed to Exchange Lists of Predicted Input" with named inventors R. L. Bertram and W. T. Oldfield;

application Ser. No. 08/814,034 filed 10 Mar. 1997, entitled "Mobile Client Computer Interacting with Docking Device" with named inventors E. H. Booth, B. A. Carpenter, R. B. Ferrier, R. A. Resnick and W. W. Vetter;

application Ser. No. 08/706,990 filed 22 Aug. 1996, entitled "Mobile Client Computer Programmed to Copy Lists of Predicted Input" with named inventors R. L. Bertram, P. J. Brittenham and D. F. Champion;

application Ser. No. 08/963,475 filed 03 Nov. 1997, entitled "Mobile Client Computer with Battery Charging Control" with named inventors C. Burroughs, B. A. Carpenter, G. O'Neil and R. A. Resnick;

application Ser. No. 08/813,148 filed 7 Mar. 1997, entitled "Mobile Client Computer Programmed for Systems Message Display" with named inventors R. L. Bertram and D. F. Champion;

application Ser. No. 08/960,914 filed 30 Oct. 1997, entitled "Mobile Client Computer Programmed with Browser Function" with named inventors R. L. Bertram and D. F. Champion;

application Ser. No. 08/813,522 filed 7 Mar. 1997, entitled "Mobile Client Computer Programmed to Process Table Displays" with named inventor R. L. Bertram;

application Ser. No. 08/807,969 filed 3 Mar. 1997, entitled "Mobile Client Computer Programmed to Combine Cursor, Control and Input Functions" with named inventors P. J. Brittenham and L. D. Comeford;

application Ser. No. 08/813,527 filed 3 Mar. 1997, entitled "Mobile Client Computer Programmed to Display Drop Down Scrolling. Indicator" with named inventors R. L. Bertram and D. F. Champion;

application Ser. No. 08/813,521 filed 7 Mar. 1997, entitled "Mobile Client Computer Programmed to Hide Empty Table Elements" with named inventor R. L. Bertram;

application Ser. No. 08/959,997 filed 29 Oct. 1997, entitled "Mobile Client Computer with Integrated Cellular Telephone" with named inventors B. A. Carpenter, P. Lee, M. Noll and R. Reiland; and application Ser. No 08/700,608 filed 12 Aug. 1996, entitled "Mobile Client Computer Programmed to Display Hexagonal Keyboard" with named inventors R. L. Bertram, D. F. Champion and L. S. Eichorn.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified under brand names such as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modern and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

With mobile client systems as described to this point, various difficulties are introduced by the limited display area which can be provided while achieving other design characteristics. Certain of those difficulties have to do with entry of data into fields which may require alphanumeric data, such as a street address or a customer name. Such requirements typically arise in any form filling application, such as handling of warehouse orders, business deliveries, hospital patient and treatment records, and the like. All of these environments of use are environments in which mobile client systems linked to data repository systems are in use.

Where form filling capabilities are required, a successful approach has been the development of what are here called "forms widgets". The terminology "widget" originated in AIX programming as meaning a graphic device which can receive input from a keyboard or pointer and communicate with an application program or another widget by means of a callback. As here used (and consistent with the AIX definition), a "widget" is a small tool or component of code on a display which accomplishes a specific task. For example, a forms widget may supply a character string for a particular data or information field in a form which is in use. An example might be a forms widget to supply a two letter state identifier for a particular field in a form which requires an address. The forms widget, in this instance, would select from among the fifty combinations of two letters adopted by the United States Postal Service to identify the states of the United States. In the example given, the list from which the data is to be supplied is restrained. In other examples, such as a name field for an address form, the list may be essentially unrestrained and must be open to the possibility of additions or manual entry apart from any preselected list.

SUMMARY OF THE INVENTION

With the foregoing as background, the present invention contemplates a mobile client system in which predictive widgets are used in a form filling application. A predictive widget is one in which a predictive list is used to provide one or both of a predictive default for entry into a field or a predictive fill for the field. The predictive widget may respond intelligently to use of a form filling application by a user of a system and thus improve user productivity.

BRIEF DESCRIPTION OF THE DRAWINGS

Some of the purposes of the invention having been stated, others will appear as the following description proceeds, when taken in connection with the accompanying drawings, in which:

FIG. 8 is an illustration of the display screen of the mobile client of FIG. 2 while driven by the execution of an application program on the mobile client to display certain data;

FIG. 11 is a view similar to FIG. 8 showing the appearance of a keyboard including a list portion as displayed over the form of FIG. 8; and FIG. 12 is a table of items potentially used in a name field widget in accordance with this invention.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
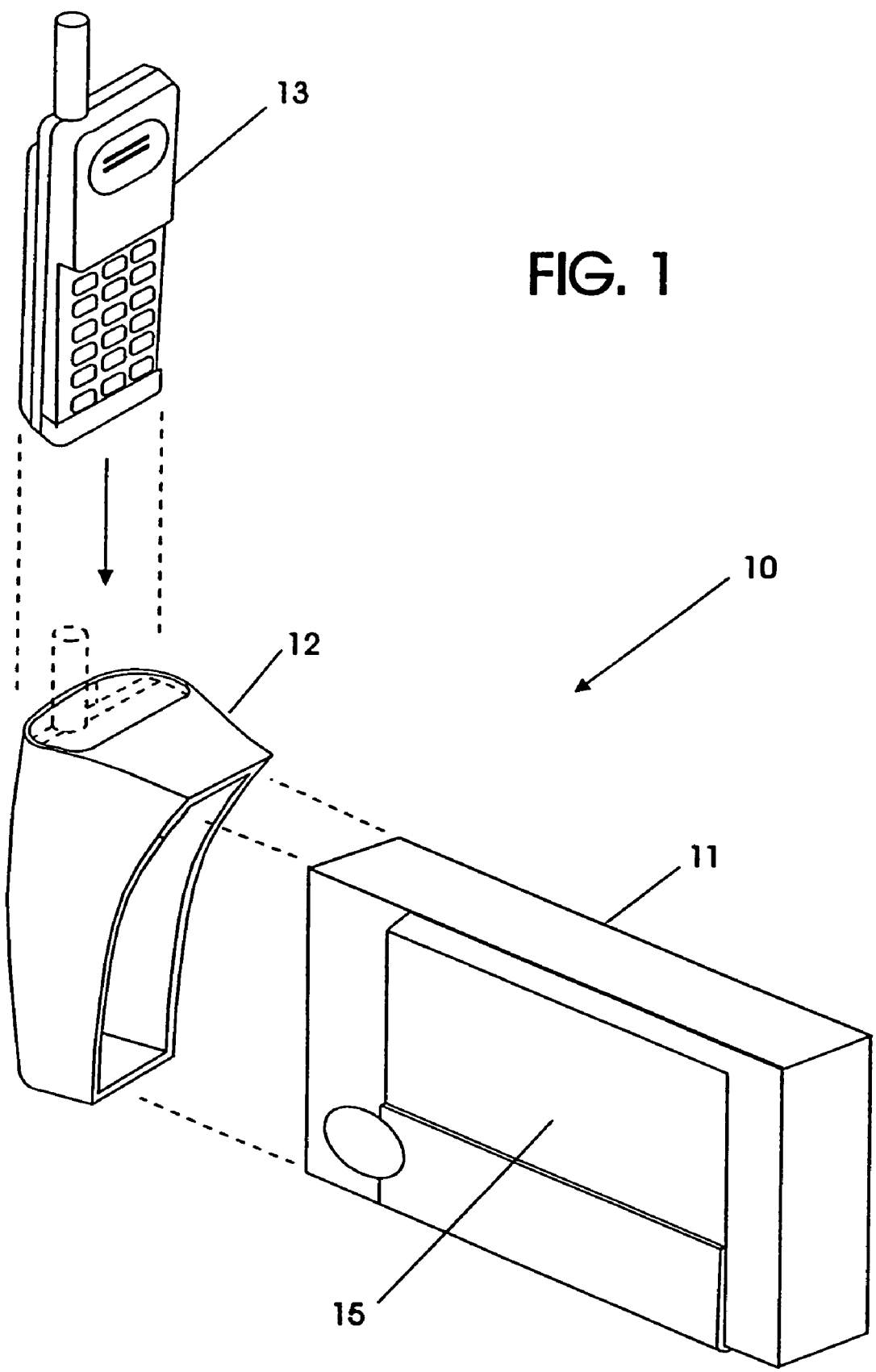
FIG. 1 is an exploded perspective view of certain elements of a mobile client computer system in accordance with this invention.
Figure 2:
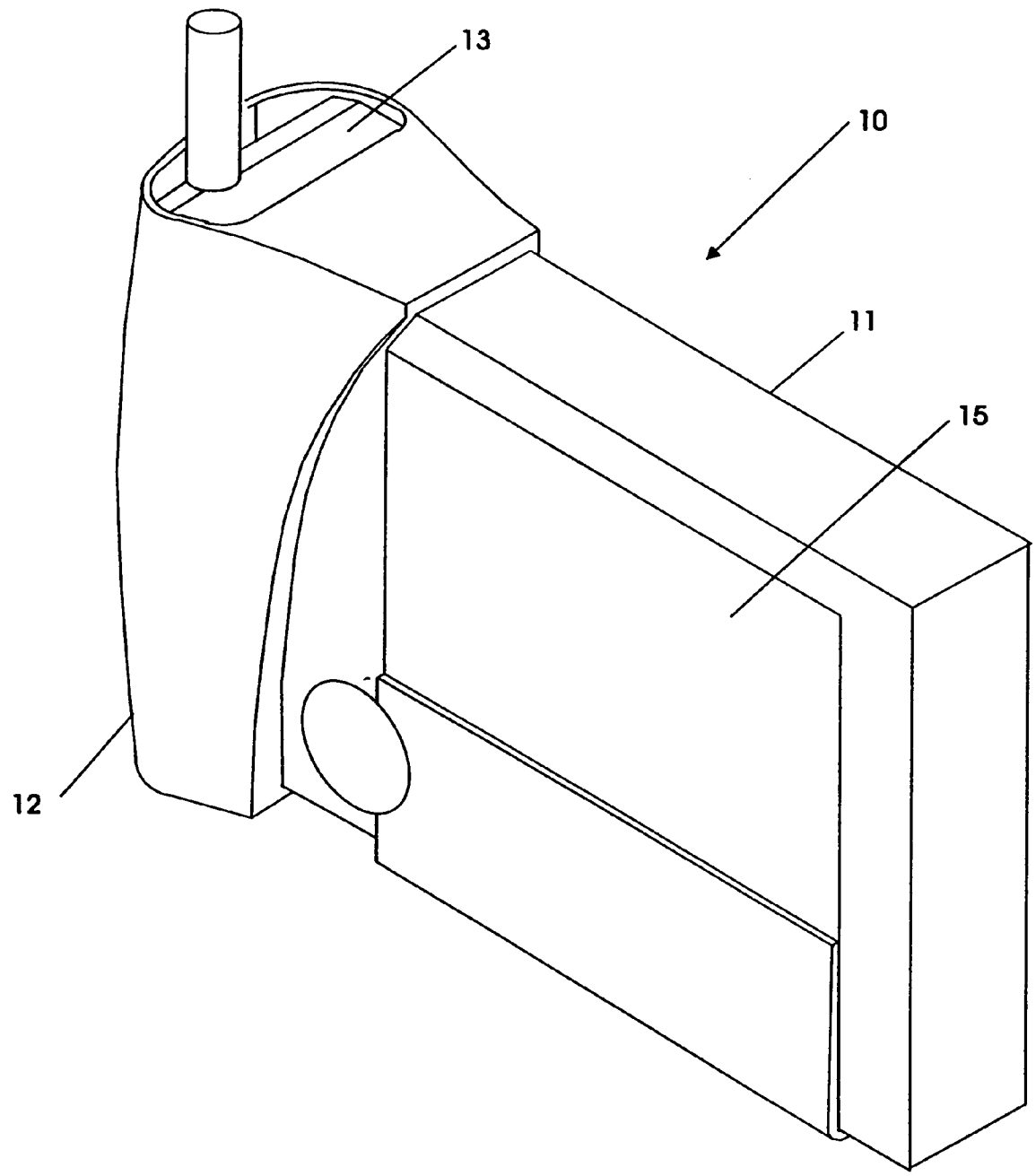
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another. More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
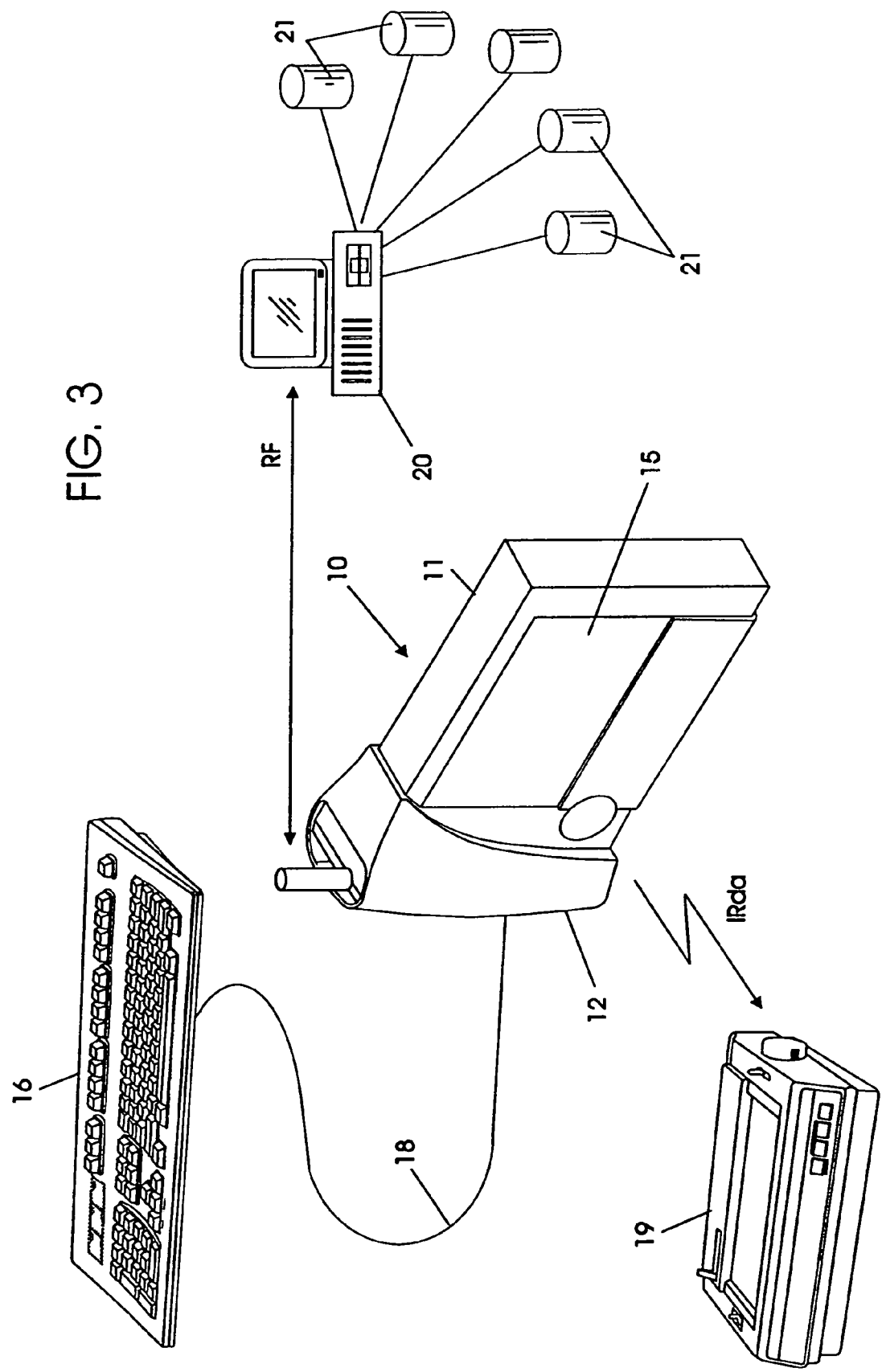
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
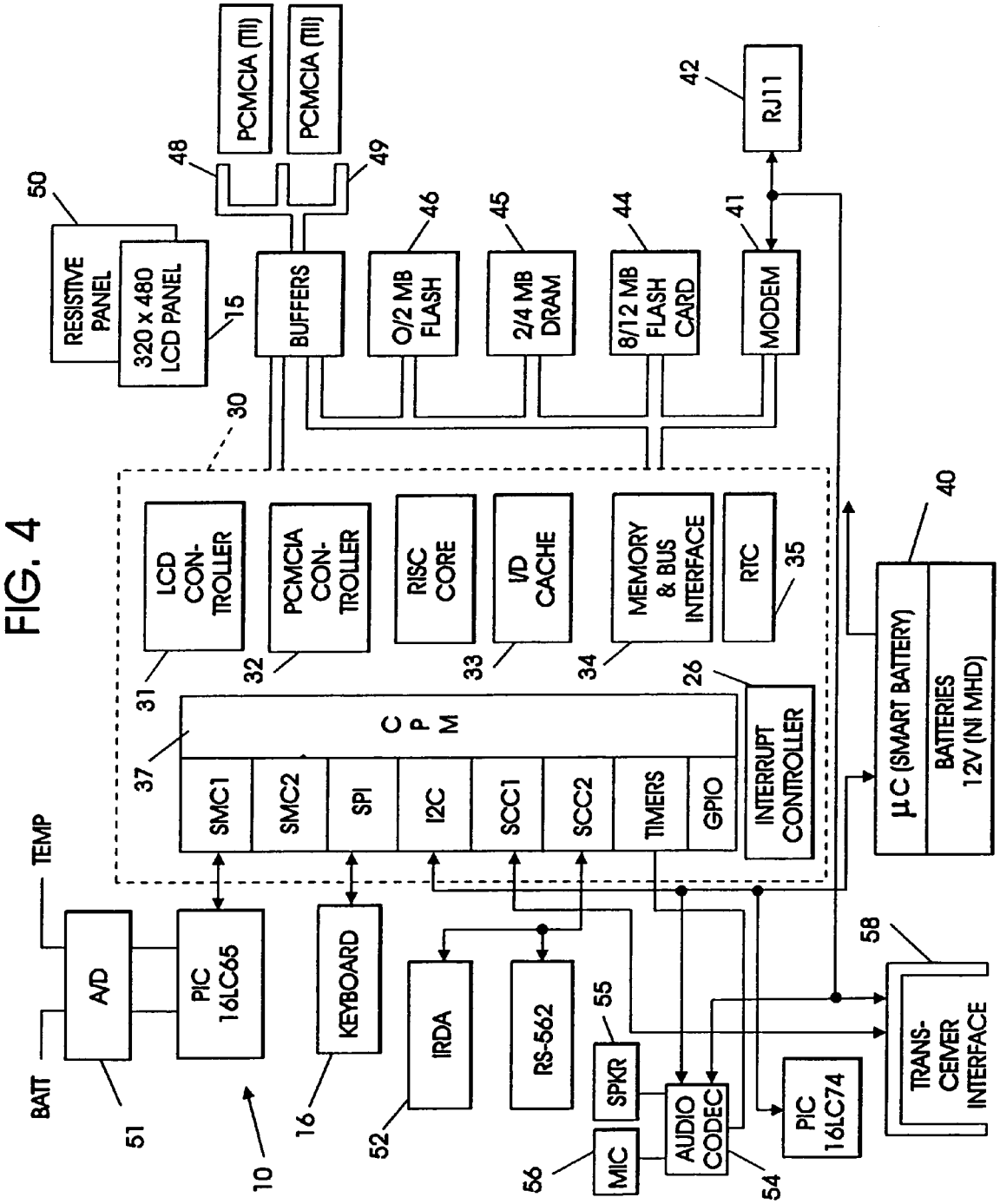
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics, The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44; by dynamic random access memory (DRAM) 45; and by core flash memory 46. Preferably, a pair of PCMCIA slots, of type II, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
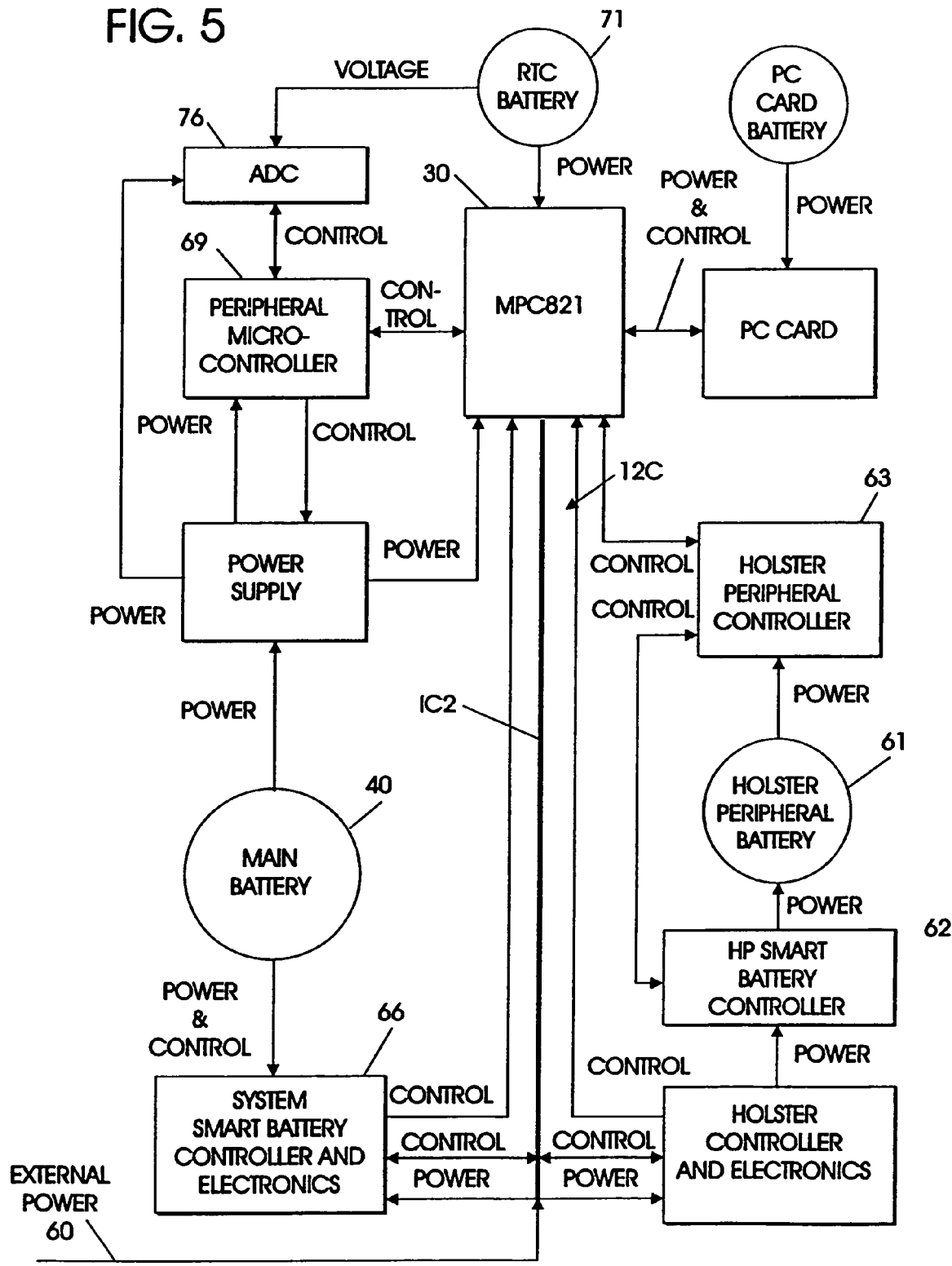
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have it's own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
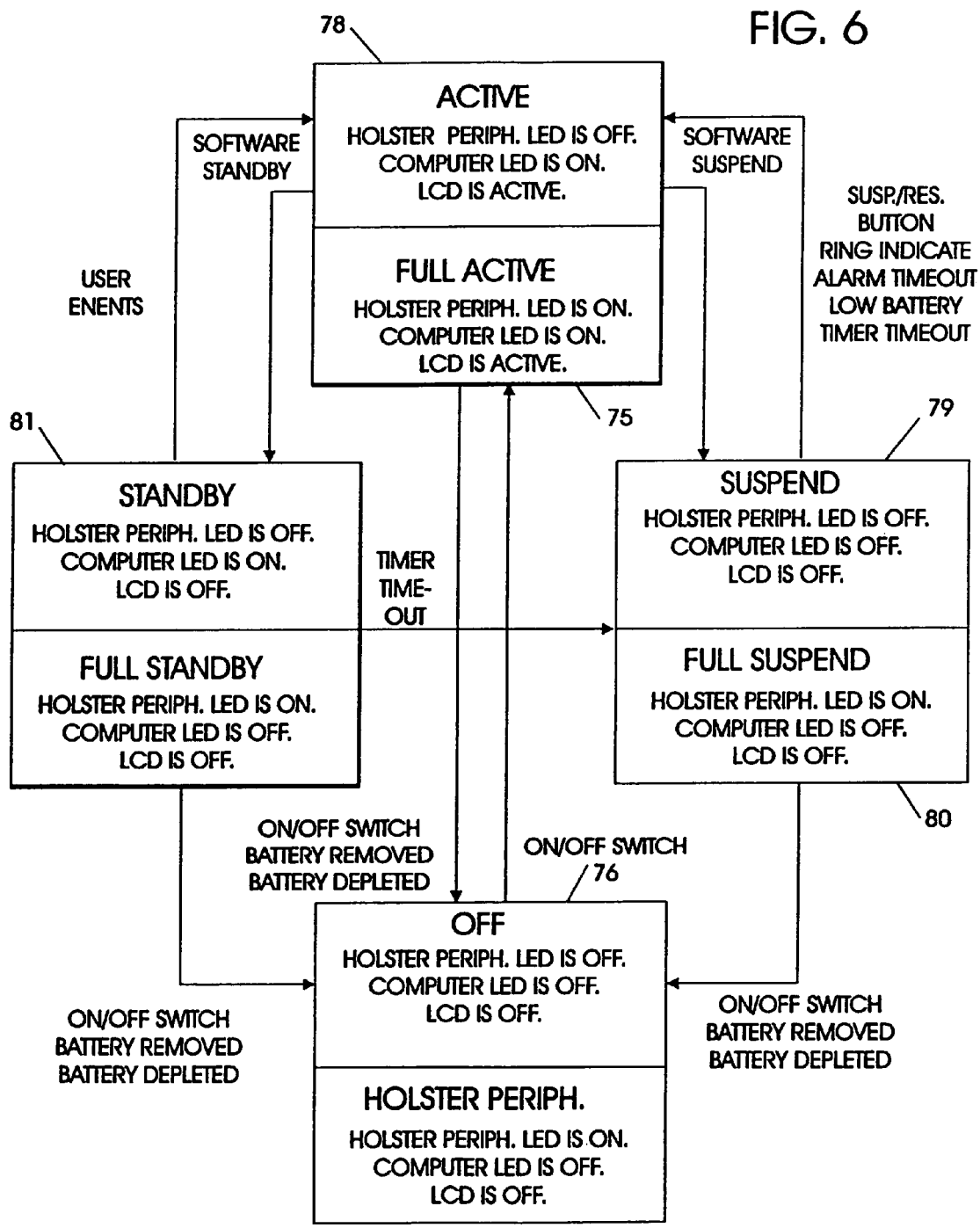
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
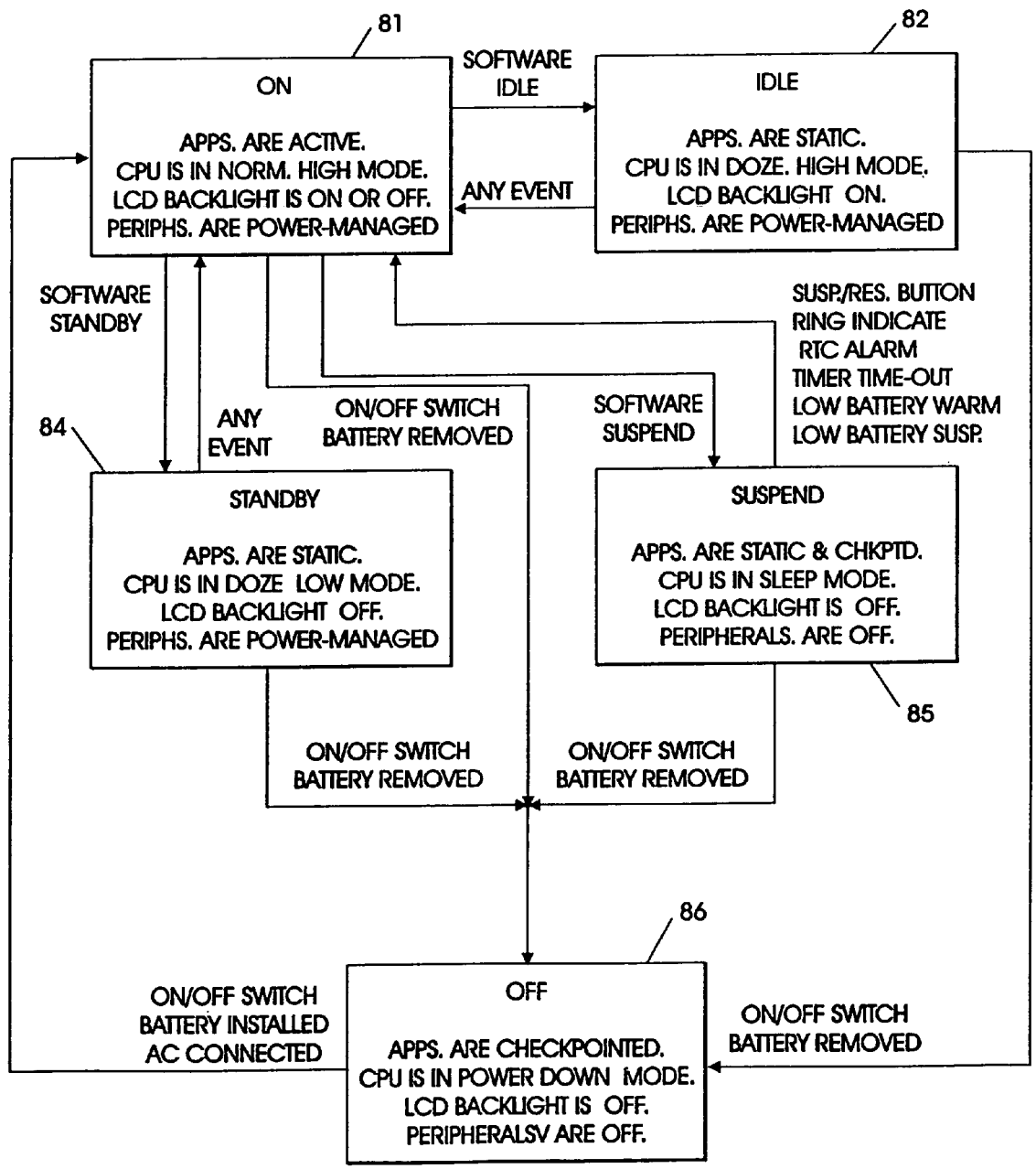
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 8. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of the applications program and the screen display will become more clear from discussion which follows or appears in the above identified related applications.

As will be understood, the area available for display of screens in a mobile client system of the type here described is limited. Such limitations impose severe restrictions on the front of screen technology used in generating displays and in providing for the input of data using a touchscreen overlaying the display area. The present invention contemplates that control programs stored accessibly to the processor of a mobile client system will cooperate with the other elements present, when executing on the processor, in accommodating the restricted display area to the needs of users of the system. This invention focuses particularly on certain of such needs.

Figures 9, 10:
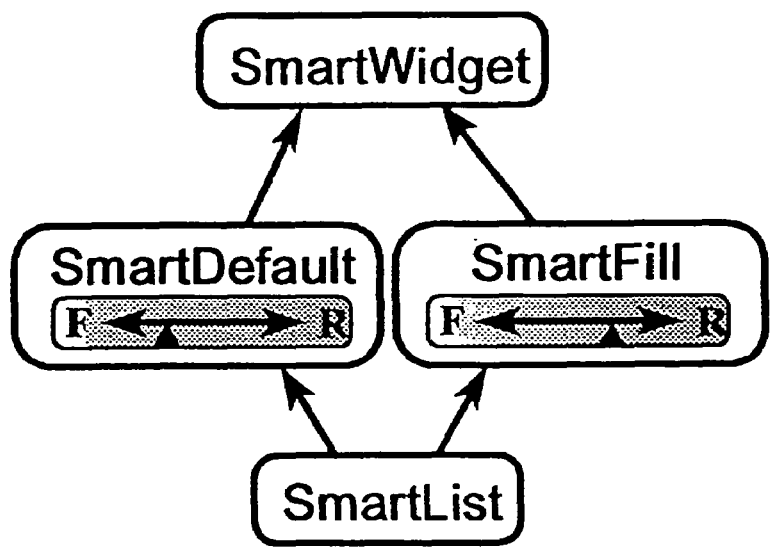
FIG. 9 is an illustration similar to FIG. 8 of a different screen display.
FIG. 10 is a schematic representation of relationships among a widget, default and fill capabilities for the widget, and a list from which the default and fill capabilities draw data.

As mentioned above, form filling applications are commonly used on computer systems. FIG. 9 shows one simple form, for which a number of forms widgets are provided. These include text widgets for a text entry field ("Name") and for a multiline text area ("Comment"). Also included are one-of-many widgets for selections in which selecting one option among several provided de-selects the remainder of the group with so-called "radio buttons" ("Eyes") or option lists ("Hair") in which one item may be selected from a pull down list. Also included are on/off switch widgets for check boxes ("Pets") and options lists ("Hobbies") where each item in a pull down list may be checked or not.

The form in FIG. 9 uses styles of widgets that are representative of many possible styles. The important point is the classes of input widgets, not the particular style displayed.

Many computer applications allow a user to set a "default" for a form. In the word processing program sold under the trademark WordPerfect 6.1, for example, a template presents a form for personal information such as name, address, and phone number. A "Save as default" button causes future templates to initialize the form with the current information. Many applications save each form entered as the default, initializing the fields in the next form with data from the previous form. An application may initialize only some widgets from the previous form while initializing other widgets to a constant default. Text entry widgets are often initialized to blank.

Many applications fill in the contents of a text widget as the user types, using matching data from previous forms. The accounting program sold under the trademark Quicken 3.0, for instance, has a form for writing personal checks. After the user types each character in the "payee" text field, Quicken completes the field with a prior entry that starts with the characters typed so far. Hence the user only types enough characters to uniquely identify a previously entered payee. This feature is called QuickFill.

It is important to note that QuickFill uses an alphabetized list of prior entries. For instance, suppose previous checks include:

Twelve checks to "Ace Hardware" in the past month.

One check to "AAA" three months ago.

When the user types the letter A, QuickFill will suggest "AAA" because it comes before "Ace Hardware" alphabetically. QuickFill does not deduce that "Ace Hardware" is more likely because it was used more recently or more frequently. QuickFill suggests "Ace Hardware" only after the user types the letter C. The alphabetical nature of QuickFill's suggestions is typical for text entry widgets.

This invention contemplates the control programs stored in memory accessibly to a system processor will provide enhancements for all of the types of widgets illustrated in, and described with reference to, FIG. 9. Briefly, each widget defaults to the most likely choice based on prior forms. However, the most likely choice is determined by the frequency and recency of prior entries, and alphabetical order is only a tie-breaker. Text-entry widgets use prior entries to complete what the user is entering, but the most frequent and most recent entries are preferred.

Widgets that use frequency and recency to predict the user's choice are here called predictive widgets. Each predictive widget contains a predictive list, the list of prior or predetermined entries for that widget. The predictive list contains a record of each entry, so that it can analyze both the frequency and recency of matching entries. The predictive list is a sequence of possible data entries, organized to present the possibilities in a particular order which will vary with usage or over time in manners described more fully hereinafter.

A predictive widget uses its predictive list in two ways. First, the widget uses the list to establish a predictive default. The predictive default sets the initial state of the widget when a form is opened for use. Second, the widget uses the list to establish a predictive fill for the field in question. That is, when a field is selected for filling and a user begins the actions of entering data for the field, the initial few characters entered are used to predict the entirety of the data required to fill the field and a suggestion is made for the entire entry. (The user can accept or reject the suggested fill.)

FIG. 10 shows relationships among predictive widgets, predictive lists, predictive defaults and predictive fill. Each of these objects will be examined in turn.

Form filling programs implementing this invention can overlay existing forms systems. For instance, the HyperText Mark-up Language (HTML) supports forms with the types of widgets identified in FIG. 9. Since HTML is open and extensible, its syntax for forms widgets could be expanded to include predictive widgets. Form filling programs implementing this invention are independent of the text entry functions of a system. That is, such programs function appropriately with keyboard, hand writing recognition, voice recognition and other means of character entry.

As mentioned above, predictive default functionality sets the initial state of a widget when the form is displayed. This applies to all types of predictive widgets, including others than text entry widgets. It is possible for predictive defaults to set the widget to a constant default. This does not use the predictive list at all, and it is how a traditional widget often works. In addition, the user may be able to set the constant default manually.

However, the predictive default usually initializes the field based on the recency and/or frequency of prior entries. If the predictive default uses recency, then the entry from the previous form is always presented on a new form. For example, in FIG. 9, the default for last name might be based on recency if people in the same family are sometimes entered together. If the predictive default uses frequency, then the prior entry that was used most often is presented on the new form. (In this case, recency would serve as a tie-breaker when two or more entries have the same frequency.) For example, in FIG. 9, if most people being entered have blue eyes, then "Blue" is always selected. The predictive default can also combine frequency and recency instead of depending on one or the other. This is illustrated by the "F+R" bar or balance in FIG. 10 with an "F" for Frequency and an "R" for Recency. Instead of a switch between frequency and recency, the predictive default provides a continuum.

For instance, consider a worker in a North Carolina parcel delivery company who records the destination of each package on a computing system. Suppose that 30% of the company's packages go to Charlotte, 20% go to Chapel Hill and less than 20% go to any one other city. On first consideration, the predictive default for the city entry widget on the worker's computing system might be assumed to always be Charlotte, i.e. that it should be based on frequency alone. However, suppose that packages going to a particular city are often sitting next to each other, since clients tend to send packages from one place to another in groups. Hence, if one package is bound for Chapel Hill, there is a better chance that the next one will be also. And if two packages in a row are bound for Chapel Hill, the probability is even higher that the next package will also be bound for Chapel Hill instead of Charlotte. Hence, the predictive default would more appropriately be based on recency as well as frequency. Perhaps after two Chapel Hill packages are entered, the default switches to Chapel Hill. But when the worker breaks the Chapel Hill sequence with a package destined for Charlotte, then the recency of one Charlotte entry plus the frequency of Charlotte entries cause the default to switch back to Charlotte.

A special case of a predictive default is a widget that selects from a continuum, such as a scroll bar. For these widgets, the predictive default might suggest the mean of previous entries rather than the median. The goal is to position the widget closest to its most likely final value.

The predictive fill functionality suggests the most likely strings to complete what the user enters and may be most applicable to text entry widgets. Like predictive default, predictive fill uses frequency, recency, or a combination of the two. Predictive defaults and predictive fill use the same predictive list. However, the two functions can use different balances of frequency and recency. This is illustrated in FIG. 10 by the different fulcrum or pointer positions on the "F+R" balance beams.

To modify the example given above of the parcel delivery company, assume that 35% of packages go to Raleigh, 30% go to Charlotte (as before), and 20% go to Chapel Hill (as before). Should the predictive default be based entirely on frequency, and hence set to "Raleigh", a user who enters an initial letter C will get differing suggestions for filling the field. If predictive fill depends entirely on frequency, then it would suggest "Charlotte". If predictive fill depends entirely on recency, then it suggests Charlotte or Chapel Hill, which ever was used most recently. If predictive fill uses a combination of frequency and recency, it suggests Charlotte unless Chapel Hill was used very recently, in which case Chapel Hill is preferred.

An application developer using this invention must determine the optimal balance between recency and frequency. Each field on each form may have a unique frequency/recency balance for both predictive fill and predictive default. Familiarity with the end user's environment and experimentation are required to determine the optimal balances. In general, it is expected that users will prefer predictive defaults that do not change too often, hence predictive defaults are more likely to depend on recency or frequency only. Predictive fills, on the other hand, are more likely to use frequency/recency balances.

There are several implementation details that can make predictive fill more useful. If the predictive default for a field is rejected, then the predictive default value should not be suggested again by predictive fill. For instance, if the predictive default is "Charlotte" and the user types a C, predictive fill should suggest "Chapel Hill" instead of "Charlotte", even if Charlotte is preferred, because the user has already rejected Charlotte.

The user can accept a predictive fill (or predictive default) and use only some of its letters. For instance, suppose the user wants to enter "Chapel Hill", but upon entering the letter C, predictive fill suggests "Charlotte". The user does not have to enter H, A, and P before "Chapel Hill" is suggested. Instead, the user can move to the R in "Charlotte" and enter a P over it.

Figure 11:
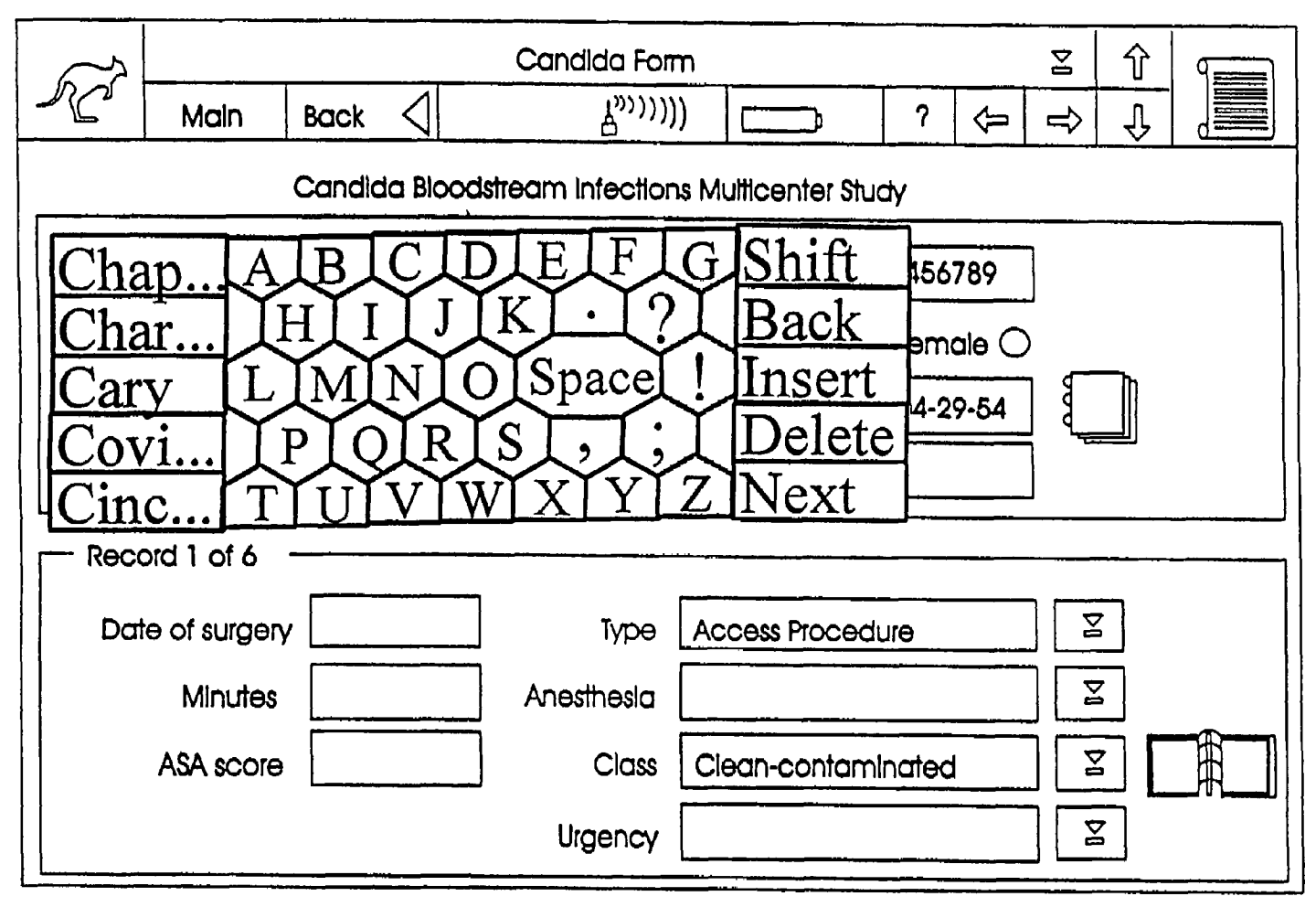

Predictive fill can display several of the top items in its list. When the user types a letter, predictive fill may complete the field with the most likely value. However, it also displays the top five most likely values in a list on the screen. The list is updated with each character the user enters. The user can select any value from the list. Predictive fill can display the list even before the user types anything, while the field still contains the predictive default. An example of this operation is shown in FIG. 11, where a predictive fill list is displayed to the left of a keyboard display. The keyboard display itself is the subject matter of one of the companion applications listed above. Predictive fill may operate on subfields as well as complete fields. In the "Name" field in FIG. 9, the first and last name may have completely separate predictive lists. Predictive fill suggests common first names (such as "John") or common last names (such as "Smith") depending on which part of the field is being considered for entry. In this example, a space separates the two subfields of first name and last name. For the "Comment" field, a period might separate subfields and predictive fill would recall sentences.

The predictive list is the accumulation over time of a collection of candidates for a field (or subfield) or a similar predetermined list established by a program developer. A field's predictive default and predictive fill use the same predictive list, but usually with different frequency/recency balances. Desirably, a predictive list is dynamic, changing each time the user completes a form containing the field.

A predictive list keeps its items sorted in several ways simultaneously. These include frequency (How often is this item used?); recency (How long has it been since each usage of this item?); and a preset weighting (If none of the items have been used before—no frequency or recency history—which are most likely?). The sorts may also include alphabetically. For alphabetic or text fields, the predictive list must limit searches to the items beginning with the characters entered by the user.

For large predictive lists, it will cause performance problems to sort the list just before or after it is used. It may be necessary to use a multitasking system to perform the sorts in the background. If the sorting algorithm is interrupted before it is finished, the predictive list must be able to function using only the sorts that it has completed (e.g. it may be forced to use alphabetic only). This is because it may be better to offer a less probable suggestion than to make the user wait for the sort algorithm to finish.

Form preparation programs embodying this invention may offer a "freeze" function which disables the sorting algorithm, stops adding new entries, and hence freezes the predictive lists. After a system has been in use for a while, the frequencies are established (assuming a static environment) and the user could choose to freeze some or all predictive lists. The user might desire this for two reasons. First, freezing the predictive lists might improve system performance. Second, freezing the predictive lists causes the predictive defaults and fills to be more consistent and predictable. For instance, the same item would always appear at the same position in a predictive fill list. For predictive lists that are frozen and have only a few items, form programs embodying this invention have a "Keypad" view of the list. Instead of presenting the items in a list, the form displays each item of the predictive list in its own button. The items are larger and have more space between them, making the predictive list easier to use.

Several fields may share the a common predictive list. For example, if there is more than one field for names on a form, the fields would share the same predictive list for names. Moreover, fields on entirely different forms may share predictive lists.

Predictive lists may eliminate the need for additional forms storage. If a form is comprised entirely of predictive widgets, then the contents of each form that the user has entered can be recalled by combining the predictive lists. For example, if all the widgets in FIG. 9 are predictive widgets, then the contents of the form from n entries ago is recovered by recalling the nth item in each widget's predictive list. For this scheme to work, all widgets must be predictive widgets with predictive lists, even if the user interface does not take advantage of the predictive list. Also, the predictive list must not overwrite items when it gets full unless the items have been saved to another location or are no longer needed.

Control programs contemplated by and embodying this invention are modular so that the developer may access any of its components. The developer may use predictive default and predictive fill objects without necessarily using predictive widgets. This is useful for developing different types of widgets unforeseen by the inventors. Also, the developer may use predictive list objects directly to recall data. Furthermore, the predictive lists can share data with general forms storage.

FIG. 12 shows an example of a Predictive list sorted by recency. In the Figure, n indicates recency, with n=0 for the most recent entry and n=9 for the first entry. The items in parentheses are "shadows" of items entered more recently, and do not require separate storage. For example, item 0 stores the text "Champion", but item 2 only stores a pointer to item 0.

The probabilistic weight of each item is given by w (lowercase). The weight, of a given string (combining the Ws of the shadows) is given by W (uppercase). The value "w" is calculated by the following formula:

$$w = \frac{b}{b+n}$$

where b is the frequency/recency balance. If b is small, then the balance is toward recency. If b is large, then the balance is toward frequency. For each non-shadowed item, the weight is determined by the equation:

$$W = \sum_{n=0}^{9} w$$

so that the total weight of a non-shadow is the weight of itself plus its shadows. The table shows the weights for balances of 1, 4, and 10. b=1 shows the strongest preference for recency. The user entered "Champion" two times recently, so it gets the highest probability (W=1.33). Notice that as b approaches 0, recency rules completely because the most recent item always has w=1 and the subsequent Ws diminish rapidly. b=10 shows the strongest preference for frequency. The user entered "Brittenham" more often than anything else, so it gets the highest probability (W=2.96). Notice that as b approaches infinity, frequency rules completely because each item has w=1. Recency is only a tie-breaker. b=4 shows a balance between recency and frequency that suggests "Bertram" as the most probable. The user entered "Bertram" three times recently. The user entered Champion more recently, but only twice, the user entered "Brittenham" more frequently, but a long time ago. The predictive list suggests "Bertram" because of its combination of recency and frequency.

It is evident that the effects of different values of b depend on the size of the predictive list. Hence, the developer must consider the size of the predictive list when setting the balance with this algorithm.

Suppose that a text entry field called "Last Name" has a predictive default of b=1 and a predictive fill of b=10. Given the predictive list state in the table above, the default for the field is "Champion" since it has the highest weight with b=1. If the user types the letter B, then predictive fill will suggest "Brittenham" instead of "Bertram" since the former has a higher weight with b=10.

This algorithm is only one possible implementation of the invention. In particular, more elaborate equations for calculating "w" may be appropriate. The balance, for instance, should be an absolute value that behaves consistently regardless of the size of the predictive list. The algorithm can be further optimized for less storage and better performance by reducing the sorting after each action by the user.

This invention further contemplates that presentation of possible data entries in a predictive list may partake of both characteristics of recency and frequency in ways other than the balancing described above. More particularly, considering a predictive list of a certain number of possible entries, such as ten, a certain number of positions at the beginning of the sequential list may be assigned for recency determination only. The remainder of the list may have entries assigned positions in the sequence based on frequency only. Thus in displaying the list for a predictive fill or predictive default, the first few entries displayed would be based on the most recent entries selected by a user, while entries displayed further down the list would be displayed based on the frequency with which those entries were selected during past use of the application. The "parting line" between recency and frequency is user determined. Thus in the example given of a ten entry list, a user may chose to have the first three positions displayed based on recency, with positions four through ten based on frequency. Thus with each resorting of the list, the most recently used entry would be displayed in the first position, above the next previous entries chosen.

This method of handling recent and frequent entries has several advantages. It is universally applicable, so that an application developer no longer need determine the best frequency and recency characteristics for each text widget. All text widgets in an application can use the same algorithm, so that a user will learn what behavior to expect. Consistency of the algorithm from widget to widget enables an easier understanding by a user of what occurs from one entry to the next. Negative impact on system performance is lessened, as calculations are simplified. Demands on system memory are lessened, as storage of recency data for each entry is avoided; frequency data is still stored for each item, while recency is handled by a short list of pointers to the last n items (where n=3 in the example given just above).

The technology which has been described is applicable not only to form filling widgets useful with mobile client computer systems, but also with systems of other types which may present needs for completing forms. Examples of other systems in which this invention will have utility are shown and described in U.S. Pat. No. 5,539,479 issued 23 Jul. 1996, assigned to common ownership with the invention here described, and to which the interested reader is referred.

In the drawings and specifications there has been set forth a preferred embodiment of the invention and, although specific terms are used, the description thus given uses terminology in a generic and descriptive sense only and not for purposes of limitation.

The invention claimed is:

1. A mobile client computer comprising:
a housing sized to be held and manipulated by the hand of a user;
a processor mounted within the housing for processing digital data; memory mounted within the housing for storing digital data and coupled to the processor; a display mounted in the housing and coupled to the processor and the memory for displaying information derived from digital data processed by the processor;
an input digitizer mounted in the housing and overlaying the display, the digitizer being coupled to the processor for input of digital data by a user; and
a control program stored in the memory and accessible by the processor for directing the processing of digital data by the processor;
the control program and the processor cooperating, when the control program is executing on the processor, in
a) displaying a form defining data fields; and
b) exercising a predictive widget to supply a data entry for a defined data field;
wherein the control program and the processor cooperate, when the control program is executing on the processor, in storing a predictive list and selecting a data entry from the predictive list based on a predetermined algorithm;
wherein the control program and the processor cooperate, when the control program is executing on the processor, in selecting a data entry from the predictive list based upon a user selected weighted determination of the recency and frequency of use of listed data entries.

2. A mobile client computer comprising:
a housing sized to be held and manipulated by the hand of a user;
a processor mounted within the housing for processing digital data;
memory mounted within the housing for storing digital data and coupled to the processor; a display mounted in the housing and coupled to the processor and the memory for displaying information derived from digital data processed by the processor;
an input digitizer mounted in the housing and overlaying the display, the digitizer being coupled to the processor for input of digital data by a user; and
a control program stored in the memory and accessible by the processor for directing the processing of digital data by the processor;
the control program and the processor cooperating, when the control program is executing on the processor, in
a) displaying a form defining data fields; and
b) exercising a predictive widget to supply a data entry for a defined data field;

wherein the control program and the processor cooperate, when the control program is executing on the processor, in storing a predictive list and selecting a data entry from the predictive list based on a predetermined algorithm;

wherein the control program and the processor cooperate, when the control program is executing on the processor, in storing the predictive list as a sequence of possible data entries and in ordering the sequence by positioning a leading portion of the sequence based on the recency of use of listed data entries and a trailing portion of the sequence based on the frequency of use of listed data entries.

3. A computer comprising:

a housing;

a processor mounted within the housing and processing digital data;

memory mounted within the housing for storing digital data and coupled to the processor;

a display coupled to the processor and the memory to display information derived from digital data processed by the processor; and a control program stored in the memory and accessible by the processor to direct the processing of digital data by the processor;

the control program and the processor cooperating, when the control program is executing on the processor, in a) displaying a form defining data fields; and b) exercising a predictive widget to supply a data entry for a defined data field;

wherein the control program and the processor cooperate, when the control program is executing on the processor, in a storing predictive list and selecting a data entry from the predictive list based on a predetermined algorithm;

wherein the control program and the processor cooperate, when the control program is executing on the processor, in selecting a data entry from the predictive list based upon a user selected weighted determination of the recency and frequency of use of listed data entries.

4. A computer comprising:

a housing;

a processor mounted within the housing and processing digital data;

memory mounted within the housing for storing digital data and coupled to the processor;

a display coupled to the processor and the memory to display information derived from digital data processed by the processor; and a control program stored in the memory and accessible by the processor to direct the processing of digital data by the processor;

the control program and the processor cooperating, when the control program is executing on the processor, in a) displaying a form defining data fields; and b) exercising a predictive widget to supply a data entry for a defined data field;

wherein the control program and the processor cooperate, when the control program is executing on the processor, in a storing predictive list and selecting a data entry from the predictive list based on a predetermined algorithm;

wherein the control program and the processor cooperate, when the control program is executing on the processor, in storing the predictive list as a sequence of possible data entries and in ordering the sequence by positioning a leading portion of the sequence based on the recency of use of listed data entries and a trailing portion of the sequence based on the frequency of use of listed data entries.

5. A display generating system comprising:

a housing;

a processor mounted within the housing and processing digital data;

memory mounted within the housing for storing digital data and coupled to the processor;

the processor and the memory cooperating in supplying digital data driving a display of visual images; and a control program stored in the memory and accessible by the processor to direct the processing of digital data by the processor;

the control program and the processor cooperating, when the control program is executing on the processor, in a) displaying a form defining data fields; and b) exercising a predictive widget to supply a data entry for a defined data field;

wherein the control program and the processor cooperate, when the control program is executing on the processor, in storing a predictive list and selecting a data entry from the predictive list based on a predetermined algorithm;

wherein the control program and the processor cooperate, when the control program is executing on the processor, in selecting a data entry from the predictive list based upon a user selected weighted determination of the recency and frequency of use of listed data entries.

6. A display generating system comprising:

a housing;

a processor mounted within the housing and processing digital data;

memory mounted within the housing for storing digital data and coupled to the processor;

the processor and the memory cooperating in supplying digital data driving a display of visual images; and a control program stored in the memory and accessible by the processor to direct the processing of digital data by the processor;

the control program and the processor cooperating, when the control program is executing on the processor, in a) displaying a form defining data fields; and b) exercising a predictive widget to supply a data entry for a defined data field;

wherein the control program and the processor cooperate, when the control program is executing on the processor, in storing a predictive list and selecting a data entry from the predictive list based on a predetermined algorithm;

wherein the control program and the processor cooperate, when the control program is executing on the processor, in storing the predictive list as a sequence of possible data entries and in ordering the sequence by positioning a leading portion of the sequence based on the recency of use of listed data entries and a trailing portion of the sequence based on the frequency of use of listed data entries.

* * * * *